(12) United States Patent
Ishii (10) Patent No.: US 8,744,241 B2
(45) Date of Patent: Jun. 3, 2014

(54) RECORDING APPARATUS

(75) Inventor: Akiyoshi Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/632,528

(22) Filed: Dec. 7, 2009

(65) Prior Publication Data

US 2010/0166392 A1 Jul. 1, 2010

(30) Foreign Application Priority Data

Dec. 25, 2008 (JP) ................................. 2008-331285

(51) Int. Cl.
*H04N 5/92* (2006.01)
(52) U.S. Cl.
USPC .......................................... 386/248; 386/239
(58) Field of Classification Search
None
See application file for complete search history.

(56) References Cited

U.S. PATENT DOCUMENTS

| | | | |
|---|---|---|---|
| 2002/0138504 A1* | 9/2002 | Yano et al. | 707/204 |
| 2005/0141852 A1* | 6/2005 | Nagaoka et al. | 386/46 |
| 2007/0038884 A1* | 2/2007 | Campbell et al. | 714/4 |
| 2007/0070826 A1* | 3/2007 | Fujisawa | 369/30.05 |
| 2007/0294231 A1* | 12/2007 | Kaihotsu | 707/3 |
| 2008/0050089 A1* | 2/2008 | Maeda | 386/46 |
| 2008/0181580 A1* | 7/2008 | Sakai et al. | 386/124 |

FOREIGN PATENT DOCUMENTS

| | | |
|---|---|---|
| JP | 2000-293973 A | 10/2000 |
| JP | 2003-131698 A | 5/2003 |

OTHER PUBLICATIONS

Office Action issued on Feb. 12, 2013 in counterpart Japanese Application No. 2008-331285.

* cited by examiner

*Primary Examiner* — William C Vaughn, Jr.
*Assistant Examiner* — Eileen Adams
(74) *Attorney, Agent, or Firm* — Carter, DeLuca, Farrell & Schmidt, LLP (57) ABSTRACT

A recording apparatus includes a recording unit configured to record a file on a recording medium, a management unit configured to store the file recorded on the recording medium in a folder to manage the file, and a control unit configured to control the management unit to move a file which is different from a file to be divided and is stored in a folder which stores the file to be divided, to a folder other than the folder which stores the file to be divided according to an instruction to divide the file recorded on the recording medium and then store a new file created by the division in the folder which stores the file to be divided.

24 Claims, 9 Drawing Sheets

RECORDING APPARATUS

BACKGROUND OF THE INVENTION

1. Field of the Invention

The present invention relates to a recording apparatus and, in particular, to management of a file.

2. Description of the Related Art

In recent years, an apparatus for recording and reproducing a moving image signal on and from a random-accessible recording medium such as a hard disk (HDD) or a flash memory has come into wide use. The apparatus for recording and reproducing a moving image signal on and from a random-access recording medium has an advantage over a conventional apparatus for recording and reproducing a moving image signal on and from a sequential-access recording medium such as a tape in that it is easy to perform an editing work such as deleting and moving a recorded moving image.

In the apparatus for recording and reproducing a moving image signal on and from the random-access recording medium, a moving image recorded on the recording medium is managed as a file according to a determined file system. A method for using a folder to store and manage a plurality of files is discussed in Japanese Patent Application Laid-Open No. 2003-131698.

It is difficult to identify an order of reproducing a moving image file thus recorded on a recording medium from configuration of a file or a folder. For this reason, information for identifying the order of reproduction is recorded. The order of reproducing the moving image file can be identified by the information for identifying the order of reproduction. Secure digital (SD)-Video standards have been known for recording a moving image on a secure digital (SD) memory card, which is one of random-access recording media.

In the SD-Video standards, a media object data (MOD) file including a moving image data and a media object information (MOI) file including time information of the moving image data are recorded. The MOD file is stored and managed in a folder and program information (PRG_INFO) file is recorded to manage the folder storing the MOD file. A program manager (PRG_MGR) file is recorded to manage each file recorded according to the SD-Video standards.

Also in the SD-Video standards, the moving image file (MOD file) is stored and managed in a folder (stream folder). In the SD-Video standards, an order of reproducing the folder and an order of reproducing the moving image file in the folder are specified to determine an order of reproducing a recorded moving image. The order of reproducing the folder is described in the PRG_MGR file. The order of reproducing the moving image file in the folder is described in the PRG_INFO file.

In the SD-Video standards, however, the order of reproducing the moving image file cannot be specified across the different folders. Accordingly, the degree of freedom is not high in a case of changing the order of reproduction by means of editing. For example, in the SD-Video standards, a moving image file cannot be reproduced in such order that the moving image file stored in one of two folders is reproduced, then the moving image file stored in the other folder is reproduced, and again the moving image file stored in the one folder is reproduced.

In standards that manage contents such as recorded moving images as a file, an upper limit on a number of files which can be stored in one folder is generally set. Therefore, a new moving image file cannot be stored in the folder which has already stored moving image files to the upper limit.

For example, if a moving image file is divided into two files, a number of moving image files to be recorded is increased by one. However, if a moving image file cannot be newly stored in the folder in which an original moving image file is stored, one of two image files created by division is stored in a folder different from the folder storing the original moving image file.

As described above, in the SD-Video standards, the order of reproducing the moving image file cannot be specified across the different folders, so that two moving image files created by division may not be continuously reproduced.

SUMMARY OF THE INVENTION

The present invention is directed to enable a file to be stored according to a rule even if the file is divided. Further, even if a moving image file is divided, the present invention is directed to enable the divided moving image file to be continuously reproduced.

According to an aspect of the present invention, a recording apparatus includes a recording unit configured to record a file on a recording medium, a management unit configured to store the file recorded on the recording medium in a folder to manage the file, and a control unit configured to control the management unit to move a file which is different from a file to be divided and is stored in a folder which stores the file to be divided, to a folder other than the folder which stores the file to be divided according to an instruction to divide the file recorded on the recording medium and then store a new file created by the division in the folder which stores the file to be divided.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
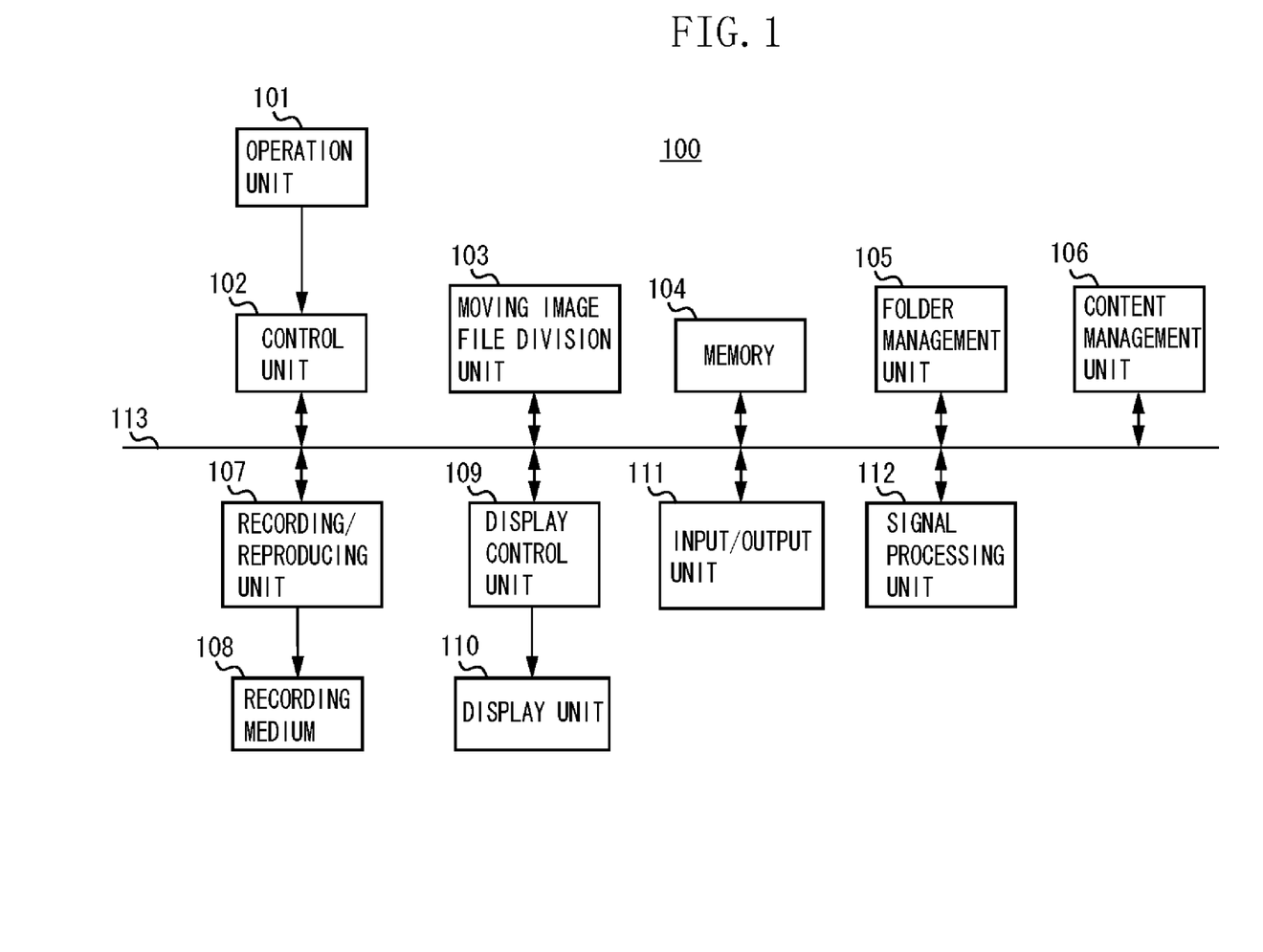
FIG. 1 is a block diagram illustrating a configuration of an image processing apparatus according to an exemplary embodiment of the present invention.

FIG. 1 is a block diagram illustrating an example of configuration of an image processing apparatus according to first exemplary embodiment of the present invention.

In an image processing apparatus 100, an operation unit 101 includes various operation switches such as a power switch, a switch for providing instructions for starting and stopping recording, and an index switch for displaying an index screen for selecting a moving image to be reproduced. The operation unit 101 also includes an operation key for providing instructions for dividing and editing a moving image. A user operates the operation unit 101 to provide instructions for starting and stopping the recording of moving image data (stream data) to be input from an input/output unit 111 or reproducing a recorded moving image and performing division processing by specifying an moving image file to be edited and an editing position.

A control unit 102 outputs information about the moving image file and the position to be divided which are specified by the user to a moving image file division unit 103. The control unit 102 instructs a folder management unit 105 to record and delete the moving image file and update folder management information to be required by division.

The control unit 102 instructs a content management unit 106 to record and delete the moving image file and update content management information to be required by division. Further, the control unit 102 controls a display control unit 109 to display an input moving or reproduced image or various menu screens on a display unit 110.

A moving image file dividing unit 103 divides a moving image file recorded on a recording medium 108 according to the instruction for the division processing of the moving image file from the control unit 102. A memory 104 stores moving image data and various pieces of management information. The input/output unit 111 inputs moving image data from the outside and outputs reproduced moving image data to the outside. The folder management unit 105 processes the folder management information according to an instruction from the control unit 102. The content management unit 106 processes the content management information according to the instruction from the control unit 102.

A recording/reproducing unit 107 records and reproduces the moving image data on and from the recording medium 108 according to the SD-Video standards. The recording medium 108 is a random-access recording medium and a flash memory, for example. The recording medium 108 can be easily loaded into and ejected from the image processing apparatus 100 by a loading/ejecting mechanism (not shown).

The display control unit 109 displays a moving image from the input/output unit 111, a moving image reproduced from the recording medium 108, an index screen, or various menu screens on the display unit 110 according to the instruction from the control unit 102. A signal processing unit 112 codes the input moving image data according to a predetermined format such as a Moving Picture Experts Group (MPEG) defined by the SD-Video standards at the time of recording. The signal processing unit 112 decodes the reproduced moving image data at the time of reproducing.

The control unit 102 controls each unit via a system bus 113.

Record processing in the image processing apparatus 100 in FIG. 1 is described below.

The operation unit 101 turns on a power supply and issues an instruction to start recording to the control unit 102. Upon receiving the instruction, the control unit 102 controls each unit and temporarily stores moving image data input from the input/output unit 111 in the memory 104. The signal processing unit 112 reads the moving image data from the memory 104, codes, and stores it again in the memory 104. The recording/reproducing unit 107 reads the moving image data stored in the memory 104, adds necessary data such as a file header thereto, and records the moving image data in the recording medium 108 as a file in a form suitable for the SD-Video standards. When an instruction to stop recording are issued, the control unit 102 controls the recording/reproducing unit 107 to stop the recording of the moving image data.

In the present exemplary embodiment, the control unit 102 manages the moving image data recorded in between instructions for the start to the stop of recording as one moving image file. As the moving image data is recorded, management information is created and updated by the moving image file management unit 104 and the folder management unit 105 and recorded on the recording medium 108. In the present exemplary embodiment, the control unit 102 manages the file and the folder recorded on the recording medium 108 according to a predetermined file system such as a file allocation table (FAT). Thus, the control unit 102 records on the recording medium 108 file system information for managing the files and the folders recorded on the recording medium 108. The file system information is updated according to the recording and dividing processing on the recording medium 108 to manage the configuration of the folder.

In the present exemplary embodiment, the moving image file recorded on the recording medium 108 is stored in the folder to manage the moving image file. When moving image data is newly recorded, the moving image file to be newly recorded is stored in the last moving image folder among the moving image folders which have been presently created and recorded on the recording medium 108. A file for a new moving image file is stored following the last moving image file of the moving image files which are stored in the last moving image folder.

When a new moving image file is recorded on the recording medium 108, the control unit 102 controls the recording/reproducing unit 107 to read content management information and folder management information and store them in the memory 104. The control unit 102 controls the folder management unit 105 and the content management unit 106 to modify contents of the content management information and the folder management information stored in the memory 104 as described below. Then, the modified content management information and folder management information are recorded on the recording medium 108 by the recording/reproducing unit 107 to be updated.

Figure 2:
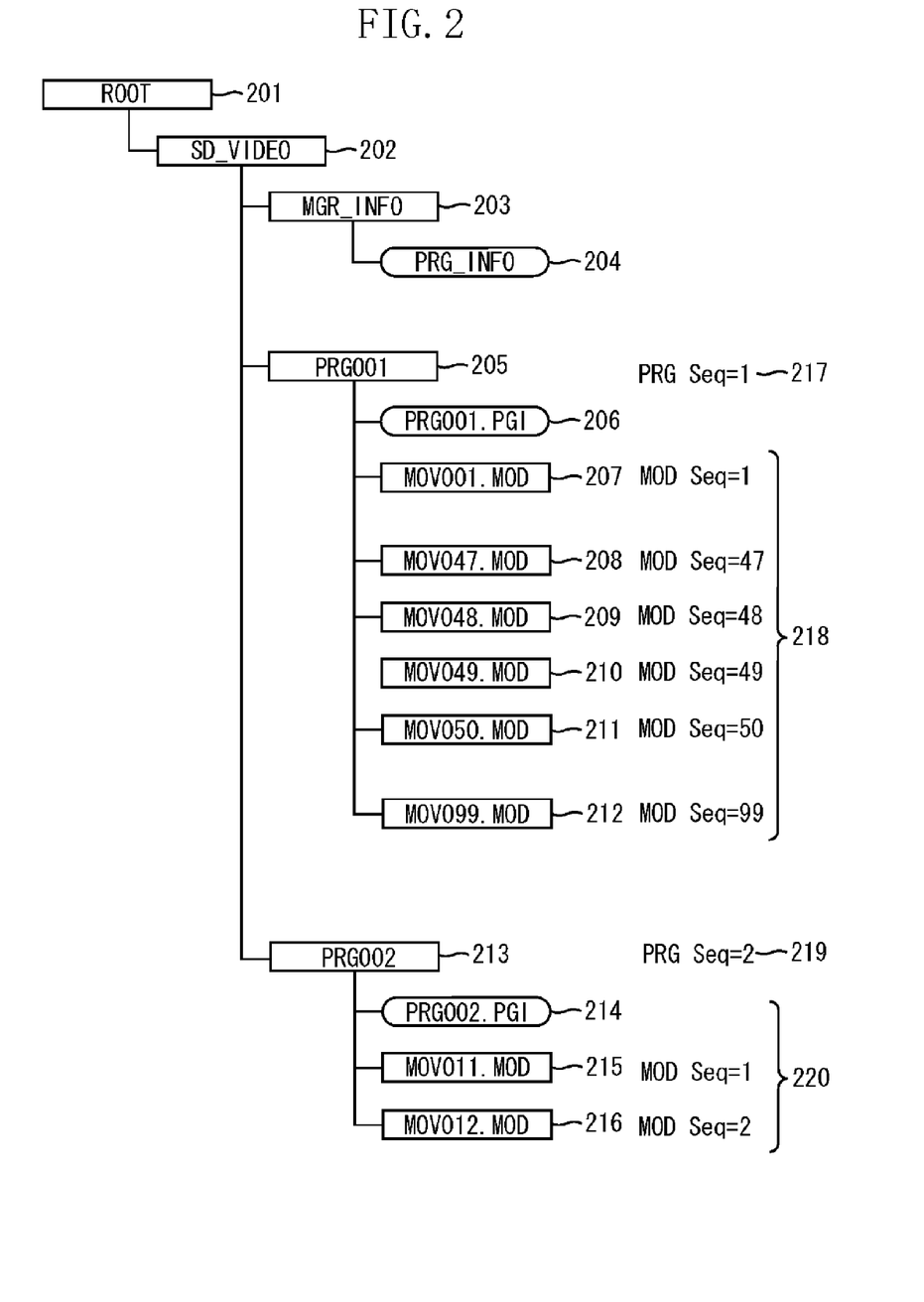
FIG. 2 illustrates an example of a configuration of a folder.

The management of the folder and the file recorded on the recording medium 108 according to the present exemplary embodiment is described below. FIG. 2 illustrates the configuration of the folders and the files recorded on the recording medium 108.

In FIG. 2, a root folder 201 is a top-level folder of the recording medium 108. A content folder 202 (SD_VIDEO) for storing the file and the folder conforming to the SD-Video standards is created under the root folder 201. Under the content folder 202, there are created a content management folder 203 (MGR_INFO) for storing management information and moving image folders 205 (PRG001) and 213 (PRG002) for storing moving image files.

In the present exemplary embodiment, there are provided an upper limit for the maximum number of moving image files which one moving image folder can store and the maximum number of moving image folders which a content folder can store. In the present exemplary embodiment, both the maximum numbers are 99.

The folder 203 stores a content management file 204 (PRG_INFO) storing the content management information. The content management file 204 includes information indicating an order of reproducing the moving image folders. In FIG. 2, the order of reproducing each moving image folder is specified so that the folders are reproduced in the order from the moving image folders 205 to 213. "PRG Seq=" 217 and 219 which indicates the order of reproducing the moving image folders are written at the right of the moving image folders 205 and 213 in FIG. 2.

The moving image folder 205 stores a folder management file 206 (PRG001.PG1) storing the folder management information for managing the moving image files stored in the moving image folder 205. Further, the moving image folder 205 stores 99 moving image files from moving image files 207 (MOV001.MOD) to 212 (MOV099.MOD).

The folder management file 206 includes information indicating the order of reproducing each moving image file stored in the moving image folder 205. In FIG. 2, the order of reproducing each moving image file is specified so that the files are reproduced in the following order: the moving image file 207; the moving image file 208; the moving image file 209; the moving image file 210; the moving image file 211; and the moving image file 212. "MOD Seq=" 218 indicating the order of reproducing such moving image files is written at the right of the moving image files in FIG. 2.

Similarly to the moving image folder 205, the moving image folder 213 stores a folder management file 214 (PRG002.PG1) storing the folder management information. Further, the moving image folder 213 stores moving image files 215 (MOV011.MOD) and 216 (MOV012.MOD). In FIG. 2, the moving image files 215 and 216 stored in the moving image folder 213 are reproduced in the order from the moving image files 215 to 216. File reproduction order information indicating such order of reproducing the moving image files is included in the file management information stored in the file management file 214. "MOD Seq=" 220 indicating the order of reproducing such moving image files is written at the right of the moving image files in FIG. 2.

When a new moving image file is recorded on the recording medium 108, the control unit 102 controls the folder management unit 105 and the recording/reproducing unit 107 to read the folder management information about the moving image folder which stores the newly recorded moving image file from the recording medium 108 and update the content.

When an attempt is made to record a new moving image file but the number of moving image files stored in the created folder reaches the upper limit, the control unit 102 creates a new folder to store the moving image file in the newly created folder. At this time, the control unit 102 controls the content management unit 106 and the recording/reproducing unit 107 to create content management information about the newly created folder and record it in the recording medium 108.

In the present exemplary embodiment, the order of reproducing moving image folders is automatically specified to reproduce the moving image folders in the order of creating them. The order of reproducing moving image files stored in each moving image folder is automatically specified to reproduce the moving image files in the order of recording them. Thus, the order of reproducing moving image folders is specified by the content management information in the SD-Video standards, so that the order of reproduction cannot be specified to duplicate the reproduction of the same moving image folder. Further, a different order of reproduction cannot be specified by producing a plurality of pieces of information per one moving image folder about the order of reproducing moving image files.

Reproduction processing is described below.

When a user operates the operation unit 101 to provide an instruction to display an index table, the control unit 102 controls the recording/reproducing unit 107 and the display control unit 109 to display an index screen which includes a representative screen of each moving image file recorded on the recording medium 108 on the display unit 110.

The user operates the operation unit 101 to select the index screen of a moving image which the user wants to reproduce from among the representative screens displayed on the index screen and instructs reproduction. When the control unit 102 receives the instruction for reproduction, the control unit 102 controls the recording/reproducing unit 107 to reproduce the moving image file corresponding to the selected representative image. The recording/reproducing unit 107 reproduces the moving image file according to the instruction from the control unit 102 and stores it in the memory 104. The signal processing unit 112 reads the moving image data reproduced from the memory 104, decodes, and stores it in the memory 104. The display control unit 109 reads the moving image data from the memory 104 and displays it on the display unit 110.

The moving image thus reproduced is displayed on the display unit 110. When the user provides an instruction to stop reproduction via the operation unit 101, the control unit 102 controls the recording/reproducing unit 107 to stop the reproduction of the moving image data. Further, the control unit 102 controls the display control unit 109 to display again the index screen on the display unit 110.

When the moving image data being reproduced is reproduced to the end, the control unit 102 selects a moving image file to be reproduced next according to the order of reproducing the moving image files specified by the content management information and the folder management information as described above. The control unit 102 controls the recording/reproducing unit 107 to automatically reproduce the moving image file to be reproduced next.

The deletion of a moving image file is described below. When a user operates the operation unit 101 to select a moving image file and provide an instruction to delete the file, the control unit 102 deletes the designated moving image file from the recording medium 108. The control unit 102 controls the recording/reproducing unit 107 and the folder management unit 105 to update the folder management information so as to change the order of reproducing the moving image files stored in the moving image folder in which the deleted moving image file was stored. More specifically, moving image files subsequent to the deleted moving image file are brought forward in the order of reproducing the moving image file.

When none of the moving image files stored in the moving image folder in which the deleted moving image file was stored, the control unit 102 deletes the moving image folder. Upon deletion of the moving image folder, the control unit 102 controls the recording/reproducing unit 107 and the content control unit 106 to update the content management information so as to change the order of reproducing the moving image folders. More specifically, moving image folders subsequent to the deleted moving image folder are brought forward in the order of reproducing the moving image.

Figure 3:
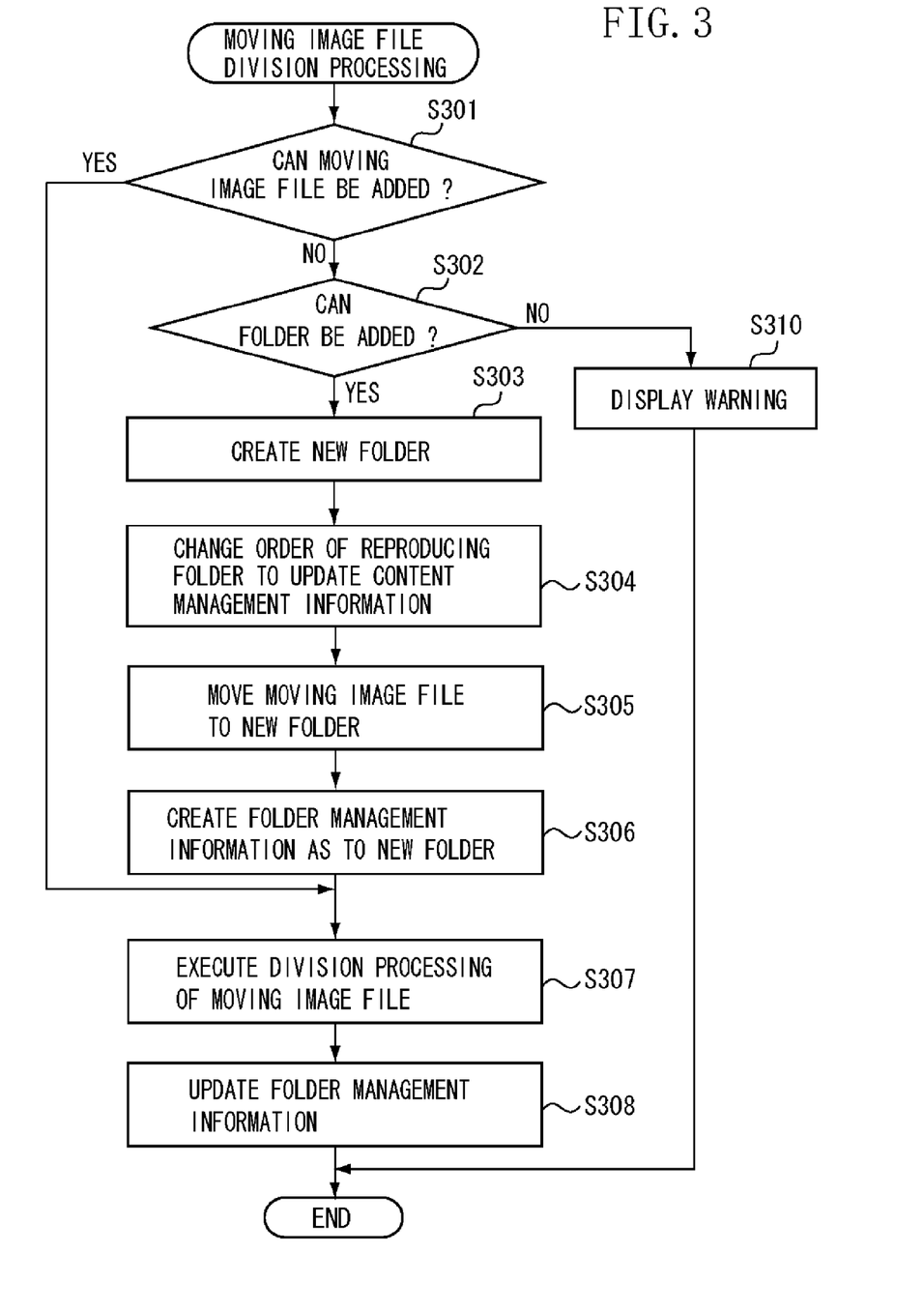
FIG. 3 is a flow chart illustrating an operation when a moving image file is divided.

Division processing of a moving image file is described below. FIG. 3 is a flow chart illustrating an operation of the division processing. The division processing in FIG. 3 is executed by the control unit 102 controlling each unit.

A user operates the operation unit 101 to select a moving image file which the user wants to divide. When the user specifies a division position of the moving image data stored in the selected moving image file and then provides an instruction for division, processing in the flow chart illustrated in FIG. 3 is started. The following description takes as an example a case where the moving image folders and the moving image files are recorded in the state illustrated in FIG. 2 and the moving image file 210 in the moving image folder 205 is selected to be provided the instruction for division.

When the user provides an instruction to execute the division processing, in step S310, the folder management unit 105 detects a number of moving image files stored in the moving image folder which stores the moving image file to be divided and determines whether a new moving image file can be stored in the moving image folder.

If it is determined that the number of moving image files stored in the moving image folder which stores the moving image file to be divided does not reach the upper limit (YES in step S301), a moving image file to be created by the division processing can be stored in the same moving image folder which stores the moving image file before the division. In other words, in the present exemplary embodiment, if the number of moving image files stored in the moving image folder which stores the moving image file to be divided does not reach 99, a new moving image file can be stored in the moving image folder. In that case, the processing proceeds from step S301 to step S307 to execute the division processing.

According to FIG. 2, since the number of moving image files stored in the moving image folder 205 is 99, it is impossible to add a moving image file to the folder any more. If it is determined that a new moving image file cannot be stored (NO in step S301), the processing proceeds to step S302. In step S302, it is determined whether a new moving image folder can be created.

In FIG. 2, the content folder 202 stores two moving image folders, so that a new moving image folder can be created. If a new moving image folder can be added (YES in step S302), the processing proceeds to step S303. In step S303, the new moving image folder is created under the content folder 202. In step S304, the order of reproducing the moving image folders is changed and the content management information recorded on the recording medium 108 is updated. At this moment, the newly created moving image folder is reproduced next to the moving image folder which stores the moving image file to be divided. Further, all the moving image folders which are reproduced subsequent to the moving image folder which stores the moving image file to be divided are moved back one by one in the order of reproducing the moving image folders. Thus, the order of reproduction is changed and the content management information recorded on the recording medium 108 is updated.

Figure 4:
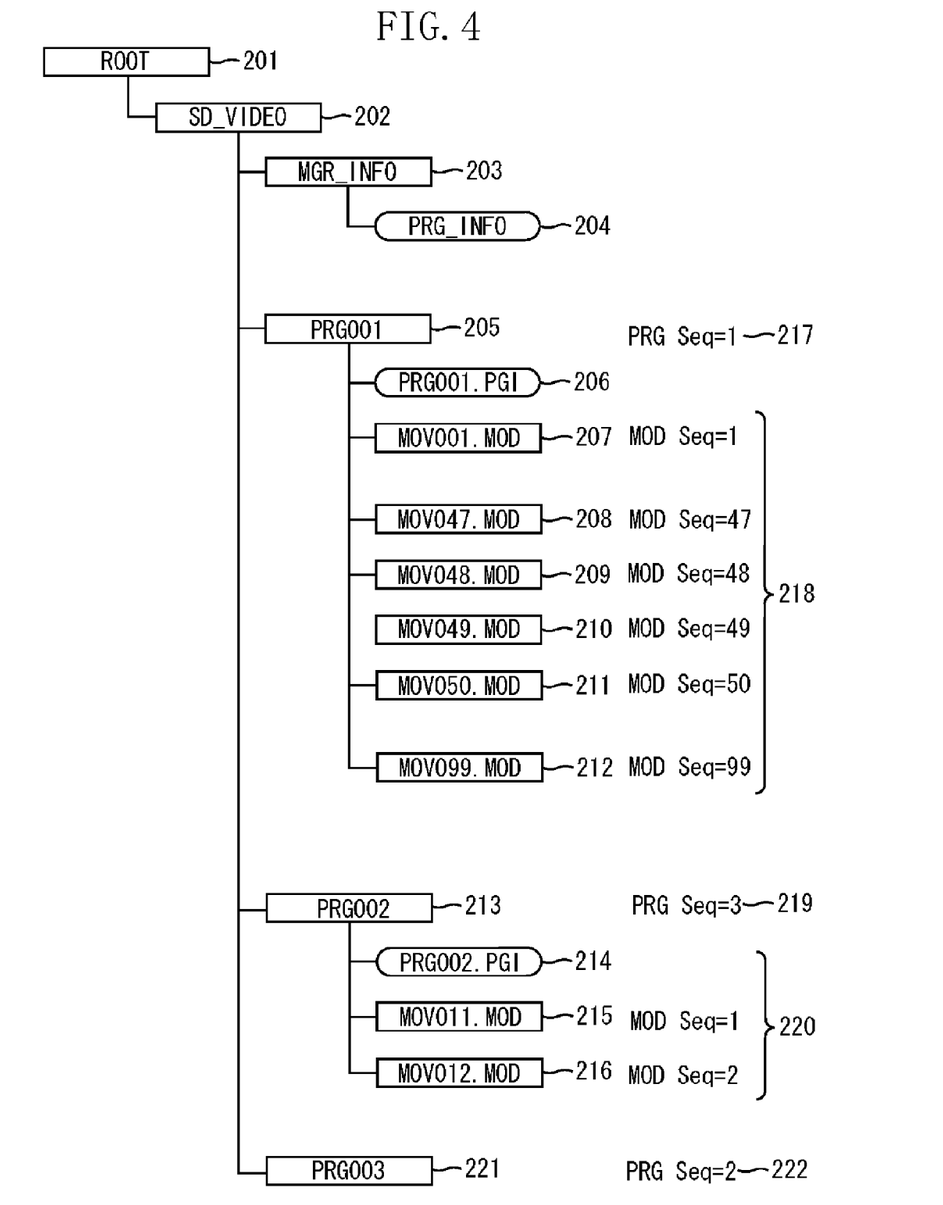
FIG. 4 illustrates an example of a configuration of a folder.

FIG. 4 illustrates the configuration of the folder in a state where a new moving image folder is created from the state in FIG. 2 and then the order of reproducing the moving image folders is changed. In FIG. 4, a moving image folder 221 (PRG003) is newly created. The moving image folder 221 is reproduced next to the moving image folder 205 which stores the moving image file 210 to be divided. The order of reproducing the moving image folder 213 that has originally been scheduled to be reproduced next to the moving image folder 205 is delayed by one folder. Thus, the moving image files are reproduced in the following order: the moving image folder 205; the moving image folder 221; and the moving image folder 213. The order of reproducing the moving image folders is indicated by "PRG Seq=" 217, 219, and 222.

In step S305, all the moving image files from the moving image file following the moving image file to be divided to the last moving image file in the order of reproduction, among the moving image files stored in the moving image folder which stores the moving image file to be divided, are moved to a newly created moving image folder.

In step S306, folder management information about the newly created moving image folder is created. The folder management information is created so that the order of reproducing the moving image files moved to the newly created moving image folder is similar to that in the moving image folder of the movement source and recorded on the recording medium 108.

Figure 5:
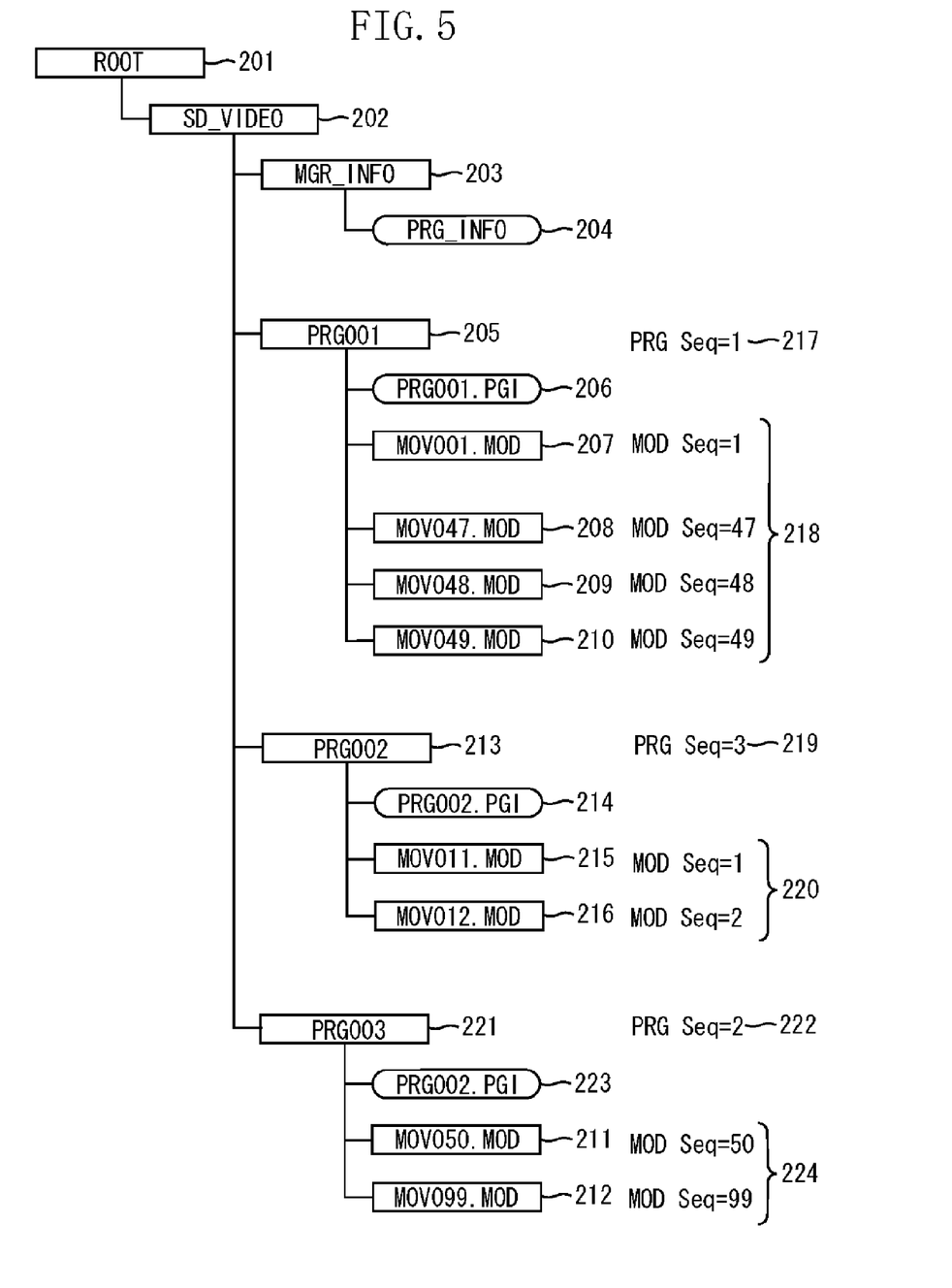
FIG. 5 illustrates an example of a configuration of a folder.

FIG. 5 illustrates the configuration of the folder in a state where the moving image file 211 reproduced next to the moving image file 210 to be divided to the moving image file 212 reproduced last in FIG. 4 are moved to the newly created folder 221 and a folder management file 223 of the moving image folder 221 is recorded. The folder management file 223 is created so that the order of reproducing the moving image files 211 to 212 stored in the moving image folder 221 is similar to that in the moving image folder 205 of the movement source. The order of reproducing the moving image files stored in the moving image folder 221 is indicated by "MOD Seq=" 224.

In step S307, the division processing of the moving image file is executed. In the division processing, the control unit 102 outputs a file name of the moving image file to be divided and information about the division position on the moving image file to the moving image file division unit 103. The moving image file division unit 103 divides the designated moving image file into the front and the back at the designated division position. The moving image data in the front and the back of the division position are stored in different files respectively as two divided moving image files.

Thus, one moving image file is divided into two moving image files by the division processing and the number of moving image files increases by one. The first half of the moving image file between the two moving image files recorded as a result of the division is given the same name as the moving image file before the division. Thus a file name can be reused. Alternatively, a new file name may be given.

Figure 6:
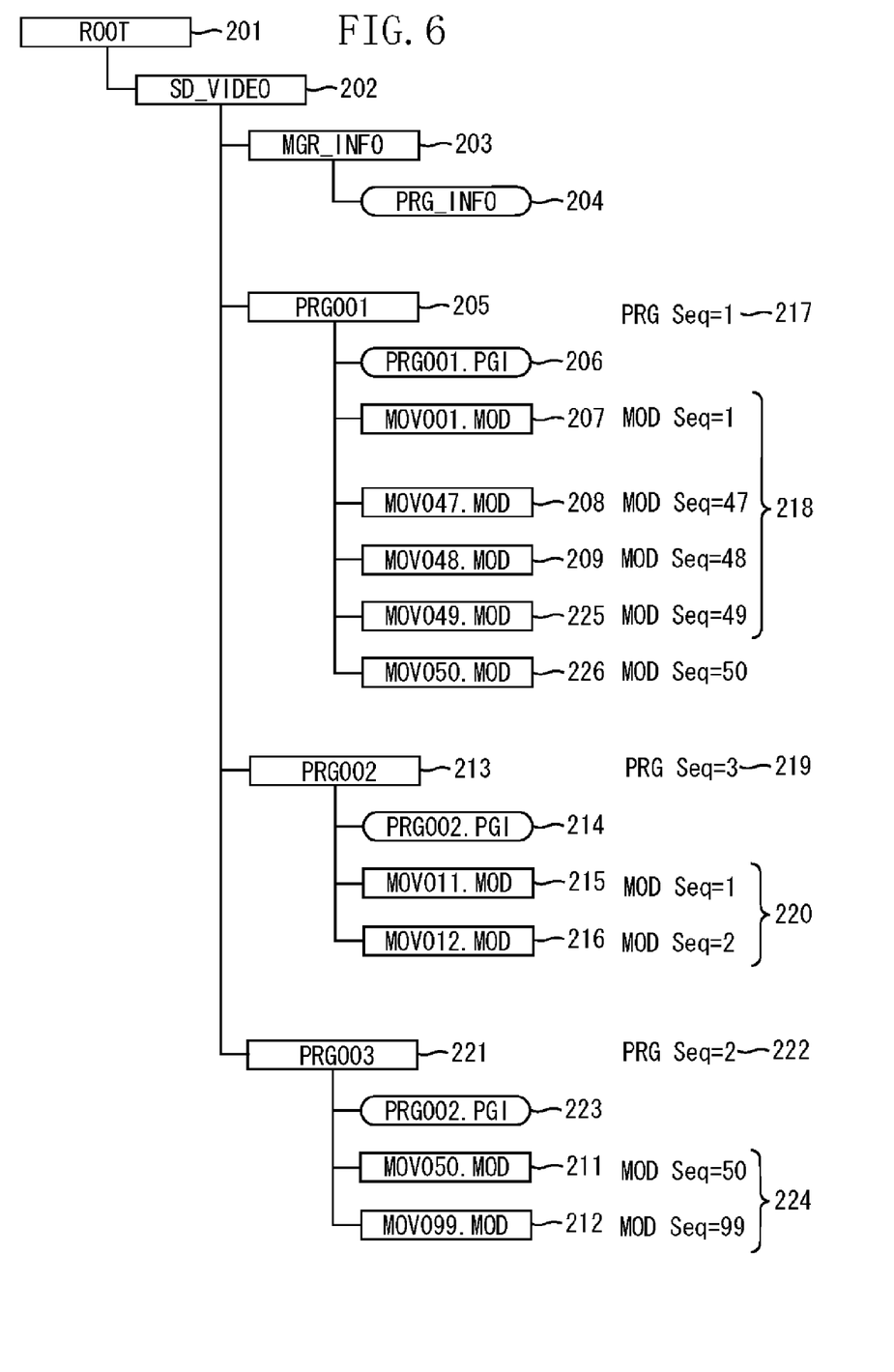
FIG. 6 illustrates an example of a configuration of a folder.

In step S308, there is updated the folder management information about the moving image folder which stores the moving image file to be divided. The folder management information is updated so that the two moving image files created by the division are continuously reproduced and the order of reproducing the moving image files is similar to that before the moving image file is divided in the moving image folder. FIG. 6 illustrates the configuration of the folder which is obtained after the division processing is executed in the state in FIG. 2.

In FIG. 6, a moving image file 225 is the first half of the divided moving image file and a moving image file 226 is the second half of the divided moving image file. The order of reproduction is changed to continuously reproduce the two moving image files 225 and 226. Further, the order of reproduction is changed to be similar to the order of reproducing the moving image files before the moving image file is divided in the moving image folder 205. Thus, the moving image files in the moving image folder 205 are reproduced in the following order: the moving image file 207; the moving image file 208; the moving image file 209; the moving image file 225; and the moving image file 226.

If it is determined that a moving image folder cannot be added (NO in step S302), the proceeding proceeds to step S310 to display on the display unit 110 warning information that it is unable to perform the division processing.

As described above, according to the first exemplary embodiment, a moving image file newly created by the division processing can be recorded without changing the order of reproducing the already recorded moving image files when the moving image file is divided. Further, the moving image file can be divided without changing the order of reproduction even if a moving image file cannot be newly stored in the folder due to a limit of the number of moving image files that the moving image folder can store. Therefore, a user can execute division of a moving image file irrespective of an arrangement of moving image files in a folder, so that convenience can be improved.

In the present exemplary embodiment, among the moving image files stored in the moving image folder which is subjected to the division processing, the moving image file to be reproduced next to the moving image file to be divided to the moving image file to be reproduced last are moved to a newly created moving image folder.

In addition to the above, at least one moving image file in reverse of the order of reproduction from the moving image file to be reproduced last among the moving image files stored in the moving image folder which is subjected to the division processing may be moved to a new moving image folder.

The moving image file to be reproduced first to the moving image file to be reproduced immediately before the moving image file to be divided, among the moving image files stored in the moving image folder which is subjected to the division processing, may be moved to a newly created moving image folder. In this case, the content management information is updated so that the newly created moving image folder is reproduced immediately before reproduction of the moving image folder which stores the moving image file to be divided.

At least one moving image file in the order from the moving image file to be reproduced first among the moving image files stored in the moving image folder which stores the moving image file to be divided may be moved to the newly created moving image folder.

In the present exemplary embodiment, one division position is specified in one moving image file and the moving image file is divided in the specified division position to create two moving image files. In addition to this, two or more division positions may be specified in one moving image file, and three or more moving image files may be created by dividing the moving image file in the specified division position. Also in this case, the present invention is similarly applicable. If one moving image file is divided into three or more files, it is determined whether all moving image files to be created by the division can be stored in the same moving image folder which stores the moving image file before the division. If it is determined that all the moving image files created by the division cannot be stored in the same moving image folder which stores the moving image file before the division, a new moving image folder may be created to move the divided moving image files and processing to change the order of reproduction as described above may be executed.

Figure 7:
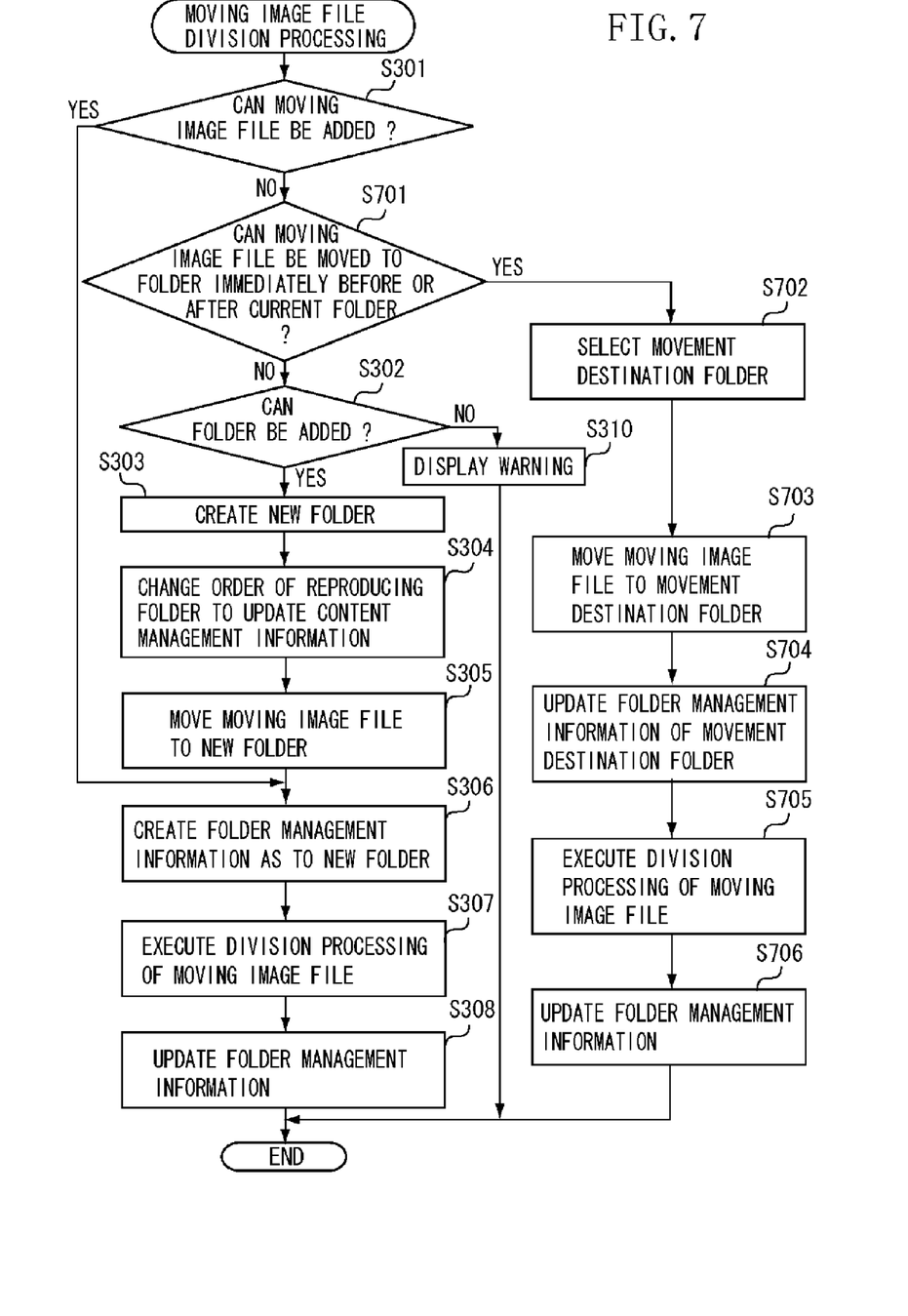
FIG. 7 is a flow chart illustrating an operation when a moving image file is divided.

A second exemplary embodiment is described below. The configuration of the image processing apparatus 100 in the second exemplary embodiment is similar to that illustrated in FIG. 1 and the basic recording and reproducing processing is also similar thereto. Therefore, a detailed description thereof is omitted. The present exemplary embodiment is different from the first exemplary embodiment in the division processing of a moving image file. FIG. 7 is a flow chart illustrating the division processing of a moving image file in the second exemplary embodiment. The processing in FIG. 7 is executed by the control unit 102 controlling each unit.

An operation of dividing a moving image file is described below using an example where the moving image file 210 in the moving image folder 205 is divided in FIG. 2. In FIG. 7, processing similar to that in FIG. 3 is given the same reference numeral.

When the user provides an instruction to execute the division processing, in step S310, the folder management unit 105 detects a number of moving image files stored in the moving image folder which includes the moving image file to be divided and determines whether a new moving image file can be stored in the moving image folder.

According to FIG. 2, since the number of moving image files stored in the moving image folder 205 is 99, it is impossible to add a moving image file to the folder 205 anymore (NO in step S301). Therefore the processing proceeds to step S701. In step S701, it is determined whether a moving image file can be stored in the moving image folder which is reproduced immediately before or after the moving image folder which includes the moving image file to be divided.

If one or both of the moving image folders immediately before and after the moving image folder which includes the moving image file to be divided do not exist or a moving image file cannot be stored in both of the moving image folders immediately before and after the moving image folder (NO in step S701), the proceeding proceeds to step S302. As is the case with FIG. 3, the processing in steps S302 to S310 are executed.

If a moving image file can be stored in at least one of the moving image folders immediately before and after the moving image folder (YES in step S701), then in step S702, the moving image folder that can store the moving image file is selected as a movement destination folder. If both the moving image folders immediately before and after the moving image folder can store moving image files, any moving image folder may be selected. However, it is desirable to select the moving image folder which stores a small number of moving image files so that the number of moving image files stored in each moving image folder is averaged. If only one of the moving image folders immediately before and after the moving image folder can store moving image files, the one moving image folder is selected as a movement destination folder.

In step S703, a predetermined moving image file is selected from among the moving image files stored in the moving image folder which stores the moving image file to be divided and moved to the moving image folder immediately before or after the moving image folder which is selected as the movement destination. At least one moving image file that is the earliest or the latest in the order of reproduction is sequentially selected as a moving image file to be moved from among the moving image files stored in the moving image folder which stores the moving image file to be divided. If the moving image file is selected from the earliest one in the order of reproduction, the moving image files before the moving image file to be divided are determined as the moving image files which can be moved. If the moving image file is selected from the latest one in the order of reproduction, i.e., in the reverse of the order of reproduction, the moving image file following the moving image file to be divided to the last moving image file are determined as the moving image files which can be moved.

If the moving image file to be divided is the earliest in the order of reproduction in the moving image folder, the moving image file that is the latest in the order of reproduction is selected as a moving image file to be moved. On the other hand, if the moving image file to be divided is the latest in the order of reproduction in the moving image folder, the moving image file that is the earliest in the order of reproduction is selected as a moving image file to be moved.

Thus, when the moving image file to be moved is selected, the moving image file is moved to the moving image folder selected as movement destination. In step S704, when the movement processing of the moving image files is completed, the folder management information about the moving image folder of the movement destination is updated. The folder management information is updated to maintain the order of reproducing the moving image files previously stored in the moving image folder of the movement destination and the moving image files moved from the moving image folder which stores the moving image file to be divided.

For example, in FIG. 2, there is no moving image folder to be reproduced immediately before the moving image folder 205 which stores the moving image file 210 to be divided and the moving image folder 213 immediately after the moving image folder 205 can store a moving image file. Therefore, the moving image folder 213 is selected as a moving image folder of the movement destination. In FIG. 2, for example, the moving image file 212 that is the latest in the order of reproduction to the moving image file 211 reproduced next to the moving image file 210 to be divided are selected, in the reverse of the order of reproduction, as the moving image files to be moved.

Figure 8:
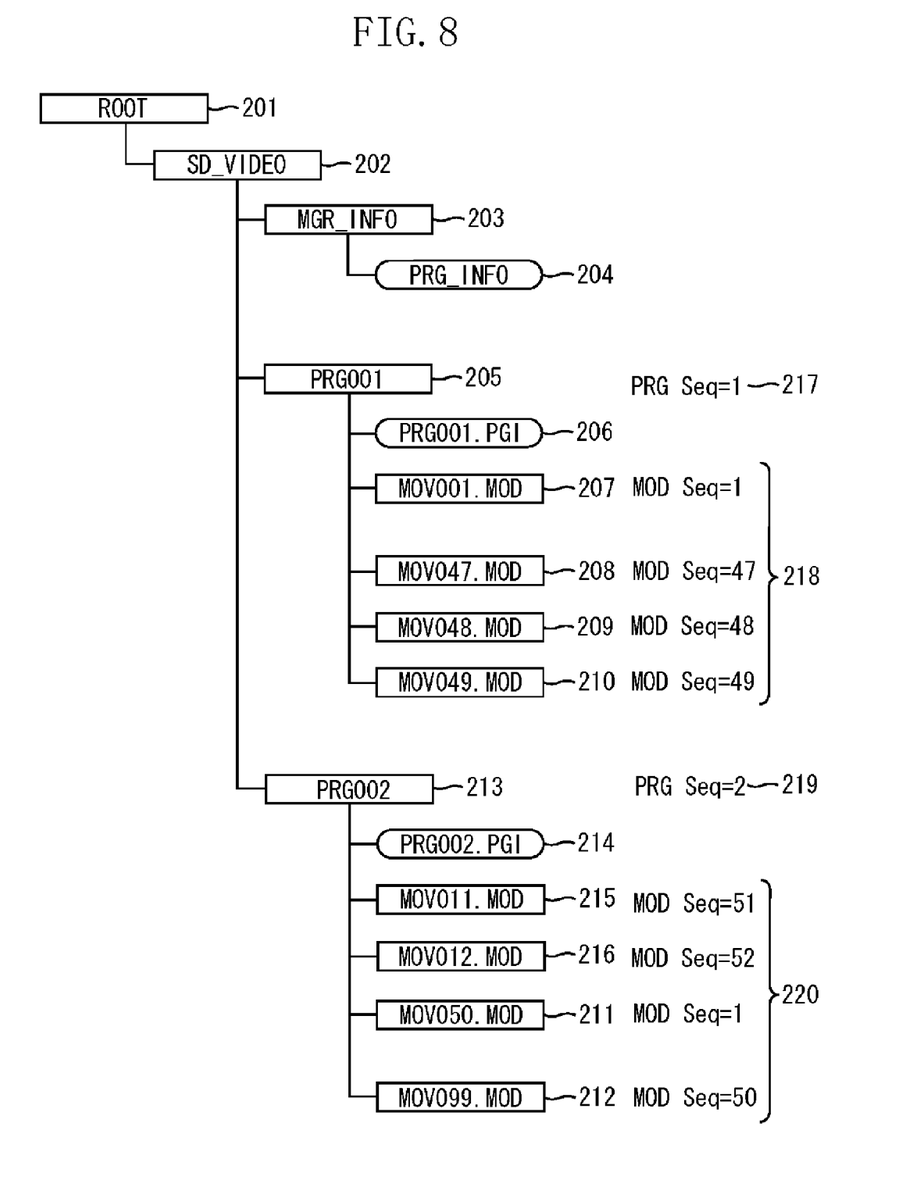
FIG. 8 illustrates an example of a configuration of a folder.

The moving image files 211 to 212 are moved to the moving image folder 213. As a result of movement, the order of reproducing the moving image files stored in the moving image folder 213 of the movement destination is changed to update the folder management file 214. FIG. 8 illustrates the configuration of the folder which is obtained after the moving image files are moved.

As illustrated in FIG. 8, the moving image folder 205 precedes the moving image folder 213 in the order of reproduction. Therefore, in the moving image folder 213 in which the moving image files are moved, the moving image files 211 to 212 moved from the moving image folder 205 precede the moving image files 215 to 216 originally stored in the moving image folder 213 in the order of reproduction.

In the folder configuration of FIG. 8, the moving image files 215 and 216 which exist in the moving image folder 213 of the movement destination differ from the moved moving image files 211 to 212 in file names, so that the file names are not changed. However, if the file name of the moved moving image file is coincided with the file name of the moving image file which exist in the moving image folder of the movement destination, the file name may be changed appropriately.

In step S705, the folder management information of the moving image folder of the movement destination is updated and the moving image file to be divided is divided. In step S706, the folder management information about the moving image folder which stores the moving image file to be divided is updated. The division processing of the moving image file and the update processing of the folder management information are similar to those of steps S307 and S308 in the first exemplary embodiment respectively, so that a detailed description thereof is omitted.

Figure 9:
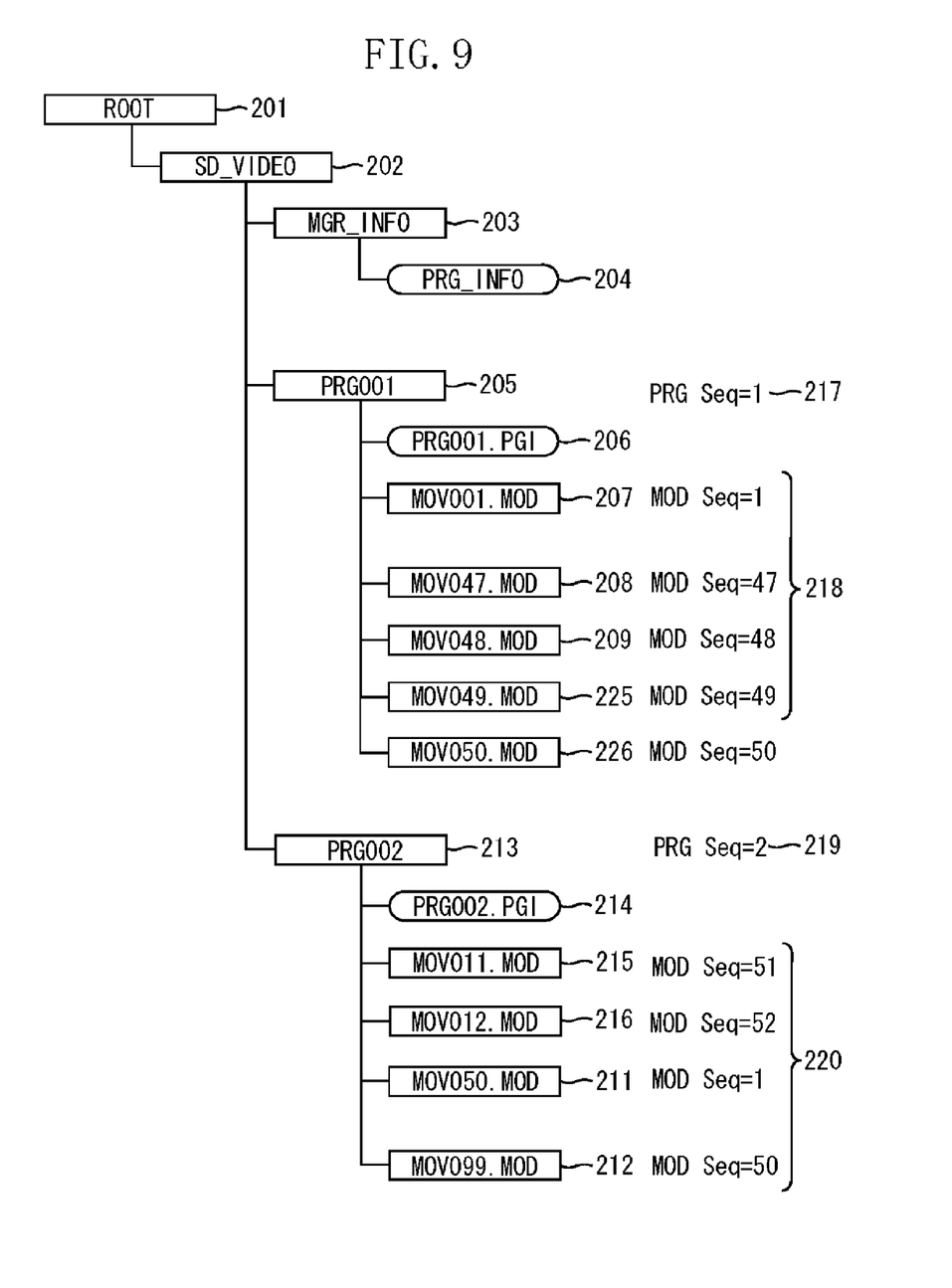
FIG. 9 illustrates an example of a configuration of a folder.

FIG. 9 illustrates the configuration of the folder which is obtained after the division processing is executed on the moving image file. In FIG. 9, the moving image file 225 is the first half of the divided moving image file and the moving image file 226 is the second half of the divided moving image file. The order of reproducing the moving image files in the moving image folder 205 is changed to continuously reproduce the two moving image files 225 and 226. Further, the order of reproduction is changed to be similar to the order of reproducing the moving image files before the moving image file is divided in the moving image folder 205. Thus, the moving image files in the moving image folder 205 are reproduced in the following order: the moving image file 207; the moving image file 208; the moving image file 209; the moving image file 225; and the moving image file 226.

As described above, according to the second exemplary embodiment, a new moving image file which is created by the division processing can be recorded without changing the order of reproducing the moving image files when the moving image file is divided. Accordingly, the moving image file can be divided without changing the order of reproduction even if a moving image file cannot be newly stored in the folder due to a limit of the number of moving image files that the moving image folder can store. Therefore, a user can execute division of a moving image file irrespective of an arrangement of moving image files in a folder, so that convenience can be improved.

In the second exemplary embodiment, if a moving image file cannot be moved to the moving image folder to be reproduced immediately before or after the moving image folder which stores the moving image file to be divided in step S701, processing in step S302 and the subsequent steps are executed. In addition to the above, if a moving image file cannot be moved to any of the moving image folders immediately before and after the moving image folder which stores the moving image file to be divided, a warning indicating that it is unable to perform the division processing is displayed on the display unit 110 and the processing may be terminated.

The above exemplary embodiments are described with the configuration of a content and file recorded based on the SD-Video standards taken as an example. The present invention is not limited to the above exemplary embodiments. Various modifications may be made and are included within the scope of the present invention. The present invention is also applicable to an apparatus which has a function of recording and reproducing a moving image file and a file which stores other information data such as a voice file and a function of dividing the file.

For example, in the above described exemplary embodiments, although the order of reproducing the moving image files in the moving image folder is described in moving image folder management information, the order of reproducing the moving image files may be determined by a file name of the moving image file and sorting rule for the file name.

In this case, the control unit 102 changes the file name of the moving image file so that the moving image file created by the division maintains the order of reproduction before the division. Further in the above described exemplary embodiments, although the order of reproducing the moving image folders is described in the content management information, the order of reproducing the moving image folders may be determined by a folder name of the moving image folder and sorting rule for the folder name.

In that case, the content management unit 106 changes the folder name of the moving image folder so that the order of reproduction performed before the moving image file is moved can be maintained when the moving image files is moved to a newly created moving image folder.

If the moving image file is divided in the moving image folder in which the number of the moving image files reaches the upper limit, in a state where the number of the moving image files reaches the upper limit in the content folder, the following can be performed. In the moving image folder which includes the moving image file to be divided, at least one moving image file on the top of the order of reproduction is moved to the moving image folder immediately before the moving image folder. Thus, the number of the moving image files in the moving image folder which includes the divided moving image file can be made fewer than the above described number of the upper limit.

The foregoing moving image file, moving image folder, folder management information, and content management information are any of the MOD file, PRG folder, PGI file, and MGR_DATA file created based on the SD-Video format.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-331285 filed Dec. 25, 2008, which is hereby incorporated by reference herein in its entirety.

What is claimed is:

1. A recording apparatus comprising:
a management unit configured to store a plurality of moving image files recorded on a recording medium in a folder to manage the plurality of moving image files;
a receiving unit configured to receive a file-divide instruction from a user; and
a control unit configured to control the management unit to divide a moving image file stored in a first folder on the recording medium in accordance with the file-divide instruction,
wherein the control unit controls the management unit to move at least one of the plurality of moving image files, which is different from a moving image file to be divided and is stored in the first folder, to another folder on the recording medium in accordance with the file-divide instruction and store a first divided moving image file and a second divided moving image file obtained by dividing the moving image file to be divided in the first folder from which the at least one of the plurality of moving image files has already been moved,
wherein the management unit stores a predetermined maximum number of moving image files that one folder on the recording medium can store and the control unit controls the management unit to store the first divided moving image file and the second divided moving image file in the first folder without moving the at least one of the plurality of moving image files if the number of moving image files stored in the first folder does not reach the predetermined maximum number of moving image files.

2. The apparatus according to claim 1, wherein the control unit selects the at least one of the plurality of moving image files to be moved to the another folder based on a predetermined condition.

3. The apparatus according to claim 1, wherein the control unit selects the at least one of the plurality of moving image files to be moved to the another folder based on an order of reproducing the plurality of moving image files recorded on the recording medium.

4. The apparatus according to claim 3, wherein the control unit selects moving image files from the moving image file next to the moving image file to be divided to the last moving image file in the order of reproduction from among a plurality of moving image files stored in the first folder and moves the selected moving image files to the another folder.

5. The apparatus according to claim 4, wherein the control unit controls the management unit, in accordance with the file-divide instruction, to create a new folder on the recording medium and move the selected moving image files to the new folder.

6. The apparatus according to claim 1, wherein the management unit manages the order of reproducing a plurality of folders on the recording medium and the control unit controls the management unit to move the at least one of the plurality of moving image files to the folder which is reproduced immediately before or after the first folder among the plurality of folders.

7. A recording apparatus comprising:
a management unit configured to store a plurality of moving image files recorded on a recording medium in a folder to manage the plurality of moving image files, wherein the management unit performs management so that a number of the moving image files stored in the folder does not exceed a predetermined number;
a receiving unit configured to receive a file-divide instruction from a user;
a division unit configured to divide a moving image file stored in a first folder on the recording medium and obtain a first divided moving image file and a second divided moving image file in accordance with the file-divide instruction; and
a control unit configured to control the management unit to move at least one of the plurality of moving image files, which is different from a moving image file to be divided and is stored in the first folder, to another folder on the recording medium if the first divided moving image file and the second divided moving image file cannot be stored in the first folder and store the first divided moving image file and the second divided moving image file in the first folder from which the at least one of the plurality of moving image files has already been moved.

8. The apparatus according to claim 7, wherein the control unit selects the at least one of the plurality of moving image files to be moved to the another folder based on a predetermined condition.

9. The apparatus according to claim 7, wherein the control unit selects the at least one of the plurality of moving image files to be moved to the another folder based on an order of reproducing the plurality of moving image files recorded on the recording medium.

10. The apparatus according to claim 9, wherein the control unit selects moving image files from the moving image file next to the moving image file to be divided to the last moving image file in the order of reproduction from among a plurality of moving image files stored in the first folder and moves the selected moving image files to the another folder.

11. The apparatus according to claim 10, wherein the control unit controls the management unit, in accordance with the file-divide instruction, to create a new folder on the recording medium and move the selected moving image files to the new folder.

12. The apparatus according to claim 7, wherein the management unit manages the order of reproducing a plurality of folders on the recording medium and the control unit controls the management unit to move the at least one of the plurality of moving image files to the folder which is reproduced immediately before or after the first folder among the plurality of folders.

13. A processing method for processing a moving image file recorded on a recording medium, the processing method comprising:
receiving a file-divide instruction from a user;
dividing a moving image file stored in a first folder on the recording medium in accordance with the received file-divide instruction;
moving at least one of a plurality of moving image files, which is different from a moving image file to be divided and is stored in the first folder, to another folder on the recording medium in accordance with the file-divide instruction; and
storing a first divided moving image file and a second divided moving image file obtained by dividing the moving image file to be divided in the first folder from which the at least one of the plurality of moving image files has already been moved, wherein a predetermined maximum number of moving image files can be stored in one folder on the recording medium, and wherein the steps of moving and storing include storing the first divided moving image file and the second divided moving image file in the first folder without moving the at least one of the plurality of moving image files if the number of moving image files stored in the first folder does not reach the predetermined maximum number of moving image files.

14. The method according to claim 13, further comprising selecting the at least one of the plurality of moving image files to be moved to the another folder based on a predetermined condition.

15. The method according to claim 13, further comprising selecting the at least one of the plurality of moving image files to be moved to the another folder based on an order of reproducing the plurality of moving image files recorded on the recording medium.

16. The method according to claim 15, wherein the step of selecting includes selecting moving image files from the moving image file next to the moving image file to be divided to the last moving image file in the order of reproduction from among a plurality of moving image files stored in the first folder, and wherein the step of moving includes moving the selected moving image files to the another folder.

17. The method according to claim 16, further comprising creating a new folder on the recording medium in accordance with the file-divide instruction, wherein the step of moving includes moving the selected moving image files to the new folder.

18. The method according to claim 13, further comprising managing an order of reproducing a plurality of folders on the recording medium, wherein the step of moving includes moving the at least one of the plurality of moving image files to the folder which is reproduced immediately before or after the first folder among the plurality of folders.

19. A processing method for processing a moving image file recorded on a recording medium, the processing method comprising:

managing a plurality of moving image files in a folder on the recording medium so that the number of the moving image files stored in the folder does not exceed a predetermined number;

receiving a file-divide instruction from a user;

dividing a moving image file stored in a first folder on the recording medium and obtaining a first divided moving image file and a second divided moving image file in accordance with the received file-divide instruction;

moving at least one of the plurality of moving image files, which is different from a moving image file to be divided and is stored in the first folder, to another folder on the recording medium if the first divided moving image file and the second divided moving image file cannot be stored in the first folder; and storing the first divided moving image file and the second divided moving image file in the first folder from which the at least one of the plurality of moving image files has already been moved.

20. The method according to claim 19, further comprising selecting the at least one of the plurality of moving image files to be moved to the another folder based on a predetermined condition.

21. The method according to claim 19, further comprising selecting the at least one of the plurality of moving image files to be moved to the another folder based on an order of reproducing the plurality of moving image files recorded on the recording medium.

22. The method according to claim 21, wherein the step of selecting includes selecting moving image files from the moving image file next to the moving image file to be divided to the last moving image file in the order of reproduction from among a plurality of moving image files stored in the first folder, and wherein the step of moving includes moving the selected moving image files to the another folder.

23. The method according to claim 22, further comprising creating a new folder on the recording medium in accordance with the file-divide instruction, wherein the step of moving moves the selected moving image files to the new folder.

24. The method according to claim 19, further comprising managing an order of reproducing a plurality of folders on the recording medium, wherein the step of moving includes moving the at least one of the plurality of moving image files to the folder which is reproduced immediately before or after the first folder among the plurality of folders.

* * * * *